(12) United States Patent
Seki et al.

(10) Patent No.: US 10,439,719 B2
(45) Date of Patent: Oct. 8, 2019

(54) LIGHTING DEVICE, LUMINAIRE, AND SIGNBOARD

(71) Applicant: Panasonic Intellectual Property Management Co., Ltd., Osaka (JP)

(72) Inventors: Keisuke Seki, Osaka (JP); Shigeru Ido, Osaka (JP); Kazuhiko Hayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/984,368

(22) Filed: May 20, 2018

(65) Prior Publication Data

US 2018/0343057 A1    Nov. 29, 2018

(30) Foreign Application Priority Data

May 25, 2017    (JP) .................................. 2017-103934

(51) Int. Cl.

| | |
|---|---|
| *H04B 10/116* | (2013.01) |
| *H05B 33/08* | (2006.01) |
| *H05B 37/02* | (2006.01) |
| *H02M 3/335* | (2006.01) |
| *H02M 1/42* | (2007.01) |

(Continued)

(52) U.S. Cl.
CPC ........ *H04B 10/116* (2013.01); *H02M 1/4225* (2013.01); *H02M 3/33507* (2013.01); *H05B 33/0815* (2013.01); *H05B 33/0845* (2013.01); *H05B 37/0272* (2013.01); *H02M 1/14* (2013.01); *H02M 3/156* (2013.01); *H02M 2001/007* (2013.01); *H02M 2001/008* (2013.01); *H04B 10/502* (2013.01); *H05B 33/0824* (2013.01)

(58) Field of Classification Search
None
See application file for complete search history.

(56) References Cited

U.S. PATENT DOCUMENTS

| 8,810,155 B2* | 8/2014 | Kamada | ............... H04B 10/116 |
| | | | 315/247 |
| 9,294,189 B2* | 3/2016 | Kido | .................. H05B 37/0272 |

(Continued)

FOREIGN PATENT DOCUMENTS

| JP | 2006-081116 | 3/2006 |
| JP | 2006-246390 | 9/2006 |

(Continued)

OTHER PUBLICATIONS

Yilmaz, Hasan, Design, Application and Comparison of Single Stage Flyback and Sepic PFC AC/DC Converters for Power LED Lighting Application, 2012. (Year: 2012).*

*Primary Examiner* — Kenneth N Vanderpuye
*Assistant Examiner* — Jai M Lee
(74) *Attorney, Agent, or Firm* — Renner, Otto, Boisselle & Sklar, LLP

(57) ABSTRACT

A lighting device includes: a constant current supply circuit; and a first modulation circuit and a second modulation circuit that are connected in series between output terminals of the constant current supply circuit. The first modulation circuit includes a first capacitor that is connected in parallel to the first modulation circuit. The second modulation circuit includes a second capacitor that is connected in parallel to the second modulation circuit.

11 Claims, 7 Drawing Sheets

(51) Int. Cl.
    *H02M 3/156*     (2006.01)
    *H02M 1/14*      (2006.01)
    *H04B 10/50*     (2013.01)
    *H02M 1/00*      (2006.01)

(56) References Cited

U.S. PATENT DOCUMENTS

| | | | | |
|---|---|---|---|---|
| 9,468,053 | B1* | 10/2016 | Kido | H05B 33/0845 |
| 2002/0012151 | A1* | 1/2002 | Feng | H04B 10/502 |
| | | | | 398/182 |
| 2005/0243022 | A1* | 11/2005 | Negru | H05B 33/0815 |
| | | | | 345/46 |
| 2005/0267791 | A1* | 12/2005 | LaVoie | G06Q 10/04 |
| | | | | 705/7.31 |
| 2006/0273985 | A1* | 12/2006 | Sun | H04B 10/502 |
| | | | | 345/46 |
| 2007/0108843 | A1* | 5/2007 | Preston | H05B 33/083 |
| | | | | 307/112 |
| 2009/0230883 | A1* | 9/2009 | Haug | H05B 33/083 |
| | | | | 315/297 |
| 2010/0109570 | A1* | 5/2010 | Weaver | H05B 33/0812 |
| | | | | 315/295 |
| 2011/0293286 | A1* | 12/2011 | Colwell | H04B 10/116 |
| | | | | 398/140 |
| 2012/0051757 | A1* | 3/2012 | Nishino | H04B 10/1149 |
| | | | | 398/201 |
| 2013/0015784 | A1* | 1/2013 | Kamada | H04B 10/116 |
| | | | | 315/297 |
| 2013/0027423 | A1* | 1/2013 | Bae | G09G 3/3413 |
| | | | | 345/619 |
| 2014/0286645 | A1* | 9/2014 | Kido | H04B 10/116 |
| | | | | 398/118 |
| 2015/0016825 | A1* | 1/2015 | Haruyama | H04B 10/116 |
| | | | | 398/118 |
| 2015/0132006 | A1* | 5/2015 | Inoue | H05B 37/0263 |
| | | | | 398/118 |
| 2015/0263808 | A1* | 9/2015 | Kondo | H04B 10/116 |
| | | | | 398/115 |
| 2016/0072581 | A1* | 3/2016 | Ikehara | G01S 1/70 |
| | | | | 398/118 |
| 2016/0072583 | A1* | 3/2016 | Naruo | H04B 10/116 |
| | | | | 398/38 |
| 2017/0013686 | A1* | 1/2017 | Ido | H05B 33/0815 |
| 2017/0188420 | A1* | 6/2017 | Kido | H04B 10/116 |
| 2018/0352627 | A1* | 12/2018 | Seki | H05B 33/0857 |
| 2019/0104579 | A1* | 4/2019 | Chiu | H05B 33/0809 |

FOREIGN PATENT DOCUMENTS

| | | |
|---|---|---|
| JP | 2010-205440 | 9/2010 |
| JP | 2010205440 A * | 9/2010 |
| JP | 2012-069505 | 4/2012 |

\* cited by examiner

LIGHTING DEVICE, LUMINAIRE, AND SIGNBOARD

CROSS REFERENCE TO RELATED APPLICATION

This application claims the benefit of priority of Japanese Patent Application Number 2017-103934 filed on May 25, 2017, the entire content of which is hereby incorporated by reference.

BACKGROUND

1. Technical Field

The present disclosure relates to a lighting device including a modulation circuit for visible light communication, a luminaire including the lighting device, and a signboard including the lighting device.

2. Description of the Related Art

There has been proposed visible light communication in which a luminaire, etc. is turned on and off at a rate that is unrecognizable to human eyes, and the bright and dark pattern produced by the turning on and off is used as a data signal. Japanese Unexamined Patent Application Publication No. 2012-69505 discloses a circuit used for such visible light communication (illumination light communication).

SUMMARY

A lighting device for visible light communication includes, for example, a constant current supply circuit and a modulation circuit. The modulation circuit modulates, and supplies a light-emitting element with the current obtained from the constant current supply circuit. In general, in order to output a plurality of types of data signals in parallel, a plurality of lighting devices each including a constant current supply circuit and a modulation circuit are necessary. In other words, in order to output a plurality of types of data signals in parallel, a plurality of constant current supply circuits are necessary.

The present disclosure provides a lighting device, a luminaire, and a signboard for visible light communication, which can output a plurality of types of data signals in parallel using a single constant current supply circuit.

A lighting device according to one aspect of the present disclosure includes: a constant current supply circuit; and a first modulation circuit and a second modulation circuit that are connected in series between output terminals of the constant current supply circuit. The first modulation circuit includes a first capacitor that is connected in parallel to an input of the first modulation circuit. The second modulation circuit includes a second capacitor that is connected in parallel to an input of the second modulation circuit. The first modulation circuit modulates, and supplies a first light-emitting element with a current obtained from one of the constant current supply circuit and the first capacitor according to a first visible-light-communication signal, and the second modulation circuit modulates, and supplies a second light-emitting element with a current obtained from one of the constant current supply circuit and the second capacitor according to a second visible-light-communication signal.

A luminaire according to one aspect of the present disclosure includes: the lighting device; the first light-emitting element, and the second light-emitting element.

A signboard according to one aspect of the present disclosure includes: the lighting device; the first light-emitting element; the second light-emitting element; a first display board that is illuminated by the first light-emitting element and that includes at least one of a character and a graphic; and a second display board that is illuminated by the second light-emitting element and that includes at least one of a character and a graphic.

According to the present disclosure, a lighting device, a luminaire, and a signboard, which can output a plurality of types of data signals in parallel using a single constant current supply circuit, are implemented.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1:
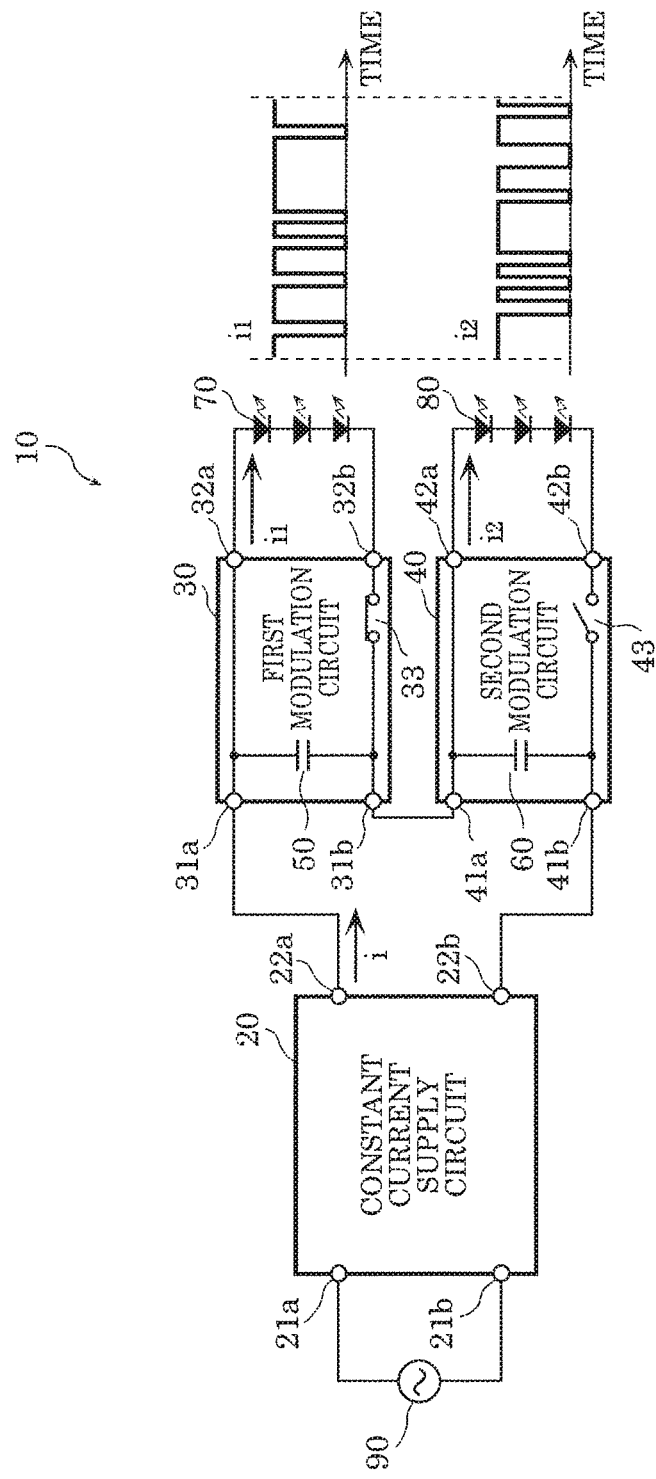
FIG. 1 is a diagram illustrating a schematic configuration of a lighting device according to Embodiment 1.

Hereinafter, embodiments are described with reference to drawings. The embodiments described below each show a general or specific example. The numerical values, shapes, materials, structural components, and the arrangement and connection of the structural components, for instance, presented in the following embodiments are mere examples, and thus are not intended to limit the present disclosure. Moreover, among the elements in the following embodiments, structural components not recited in any of the independent claims defining the broadest concepts of the present disclosure are described as optional structural components.

Moreover, the figures are schematic diagrams and are not necessarily precise illustrations. Additionally, elements that are essentially the same share like reference numerals in the figures, and overlapping explanations thereof are omitted or simplified.

Embodiment 1

[Schematic Configuration]

In the following, a lighting device according to Embodiment 1 is described with reference to FIG. 1. FIG. 1 is a diagram illustrating a schematic configuration of the lighting device according to Embodiment 1.

Lighting device 10 illustrated in FIG. 1 causes a plurality of first light emitting diode (LED) elements 70 and a plurality of second LED elements 80 to turn on and off. Lighting device 10 includes constant current supply circuit 20, first modulation circuit 30, second modulation circuit 40, first capacitor 50, and second capacitor 60.

Each of first LED elements 70 is an example of a first light-emitting element that is a load of first modulation circuit 30, and emits visible light. First LED element 70 is a surface mount device (SMD) LED element, and emits white light, for example.

Although first modulation circuit 30 causes a plurality of first LED elements 70 connected in series to turn on and off in FIG. 1, first modulation circuit 30 may cause at least one first LED element 70 to turn on and off. Moreover, a plurality of first LED elements 70 that are turned on and off by first modulation circuit 30 may be electrically connected in any manner. First modulation circuit 30 may cause, for example, a plurality of LED element groups connected in parallel to turn on and off. The LED element groups include a plurality of first LED elements 70 connected in series.

Note that the first light-emitting element is not limited to an SMD LED element. The first light-emitting element may be an LED chip that is included in a chip on board (COB) light-emitting module. The first light-emitting element may be other light-emitting elements, such as an organic electroluminescent (EL) element, an inorganic EL element, or a semiconductor laser. Moreover, the color of light emitted by the first light-emitting element is not specifically limited.

Each of second LED elements 80 is an example of a second light-emitting element that is a load of second modulation circuit 40, and emits visible light. Each of second LED elements 80 is an SMD LED element, and emits white light, for example.

Although second modulation circuit 40 causes a plurality of second LED elements 80 that are connected in series to turn on and off in FIG. 1, second modulation circuit 40 may cause at least one second LED element 80 to turn on and off. Moreover, a plurality of second LED elements 80 that are turned on and off by second modulation circuit 40 may be electrically connected in any manner. Second modulation circuit 40 may cause, for example, a plurality of LED element groups connected in parallel to turn on and off. The LED element groups include a plurality of second LED elements 80 connected in series.

Note that the second light-emitting element is not limited to an SMD LED element. The second light-emitting element may be an LED chip included in a COB light-emitting module. The second light-emitting element may be other light-emitting elements, such as an organic EL element, an inorganic EL element, or a semiconductor laser. Moreover, the color of light emitted by the second light-emitting element is not specifically limited.

Constant current supply circuit 20 includes: input terminal 21a, input terminal 21b, output terminal 22a, and output terminal 22b. Constant current supply circuit 20 converts, into direct current power, the alternating current power obtained from electric power system 90 via input terminal 21a and input terminal 21b, and outputs approximately constant direct current i via output terminal 22a and output terminal 22b.

First modulation circuit 30 includes: input terminal 31a, input terminal 31b, output terminal 32a, output terminal 32b, and first switching element 33. Between output terminal 32a and output terminal 32b, a plurality of first LED elements 70 are electrically connected. As described above, first LED elements 70 are connected in series.

First modulation circuit 30 supplies first LED elements 70 with current i1 modulated according to the first visible-light-communication signal. Current i1 is modulated by on and off of first switching element 33. This enables first LED elements 70 to turn on and off at a rate which cannot be recognized by human eyes, and a mobile terminal such as a smartphone including an image-capturing device can recognize the brightness and darkness produced by the turning on and off as a first data signal.

Second modulation circuit 40 includes: input terminal 41a, input terminal 41b, output terminal 42a, output terminal 42b, and second switching element 43. Between output terminal 42a and output terminal 42b, a plurality of second LED elements 80 are electrically connected. As described above, second LED elements 80 are connected in series.

Second modulation circuit 40 supplies second LED elements 80 with current i2 modulated according to a second visible-light-communication signal. The second visible-light-communication signal is different from the first visible-light-communication signal. Current i2 is modulated by on and off of second switching element 43. This enables second LED elements 80 to turn on and off at a rate which cannot be recognized by human eyes, and a mobile terminal such as a smartphone can recognize the brightness and darkness produced by the turning on and off as a second data signal which is different from the first data signal.

Here, first modulation circuit 30 and second modulation circuit 40 are connected in series between output terminal 22a and output terminal 22b of constant current supply circuit 20. Specifically, output terminal 22a and input terminal 31a are electrically connected, input terminal 31b and input terminal 41a are electrically connected, and input terminal 41b and output terminal 22b are electrically connected.

This enables lighting device 10 to output two types of data signals in parallel using a single constant current supply circuit 20. Note that three or more modulation circuits may be connected in series between output terminal 22a and output terminal 22b of constant current supply circuit 20.

In order to output a plurality of types of data signals without interfering with one another, first LED elements 70 and second LED elements 80 need to be turned on and off independently from each other. When second switching element 43 is on, first modulation circuit 30 can obtain current from constant current supply circuit 20, and cause first LED elements 70 to emit light. However, when second switching element 43 is off, the current loop is disconnected, and thus first modulation circuit 30 cannot obtain a current from constant current supply circuit 20. In other words, when second switching element 43 is off, first modulation circuit 30 cannot cause first LED elements 70 to emit light.

In view of the above, lighting device 10 includes first capacitor 50 connected in parallel to an input of first modulation circuit 30. One end of first capacitor 50 is electrically connected to input terminal 31a, and the other end of first capacitor 50 is electrically connected to input terminal 31b. When second switching element 43 is off, electric charge for supplying current to first LED elements 70 is accumulated in first capacitor 50. This enables first modulation circuit 30 to obtain a current from first capacitor 50 and cause first LED elements 70 to emit light when second switching element 43 is off. First capacitor 50 is an electrolytic capacitor, for example. A capacitor having a relatively large capacity may be used as first capacitor 50.

First capacitor 50 may be included in first modulation circuit 30, or need not to be included in first modulation circuit 30.

Similarly, when first switching element 33 is on, second modulation circuit 40 can obtain a current from constant current supply circuit 20 and cause second LED elements 80 to emit light. However, when first switching element 33 is off, the current loop is disconnected, and thus second modulation circuit 40 cannot obtain a current from constant current supply circuit 20. In other words, when first switching element 33 is off, second modulation circuit 40 cannot cause second LED elements 80 to emit light.

In view of the above, lighting device 10 includes second capacitor 60 connected in parallel to an input of second modulation circuit 40. One end of second capacitor 60 is electrically connected to input terminal 41a, and the other end of second capacitor 60 is electrically connected to input terminal 41b. When first switching element 33 is off, electric charge for supplying current to second LED elements 80 is accumulated in second capacitor 60. This enables second modulation circuit 40 to obtain a current from second capacitor 60 and cause second LED elements 80 to emit light when first switching element 33 is off. Second capacitor 60 is an electrolytic capacitor, for example. A capacitor having a relatively large capacity may be used as second capacitor 60. Second capacitor 60 may be included in second modulation circuit 40, or need not to be included in second modulation circuit 40.

[Specific Configuration of Constant Current Supply Circuit]

Figure 2:
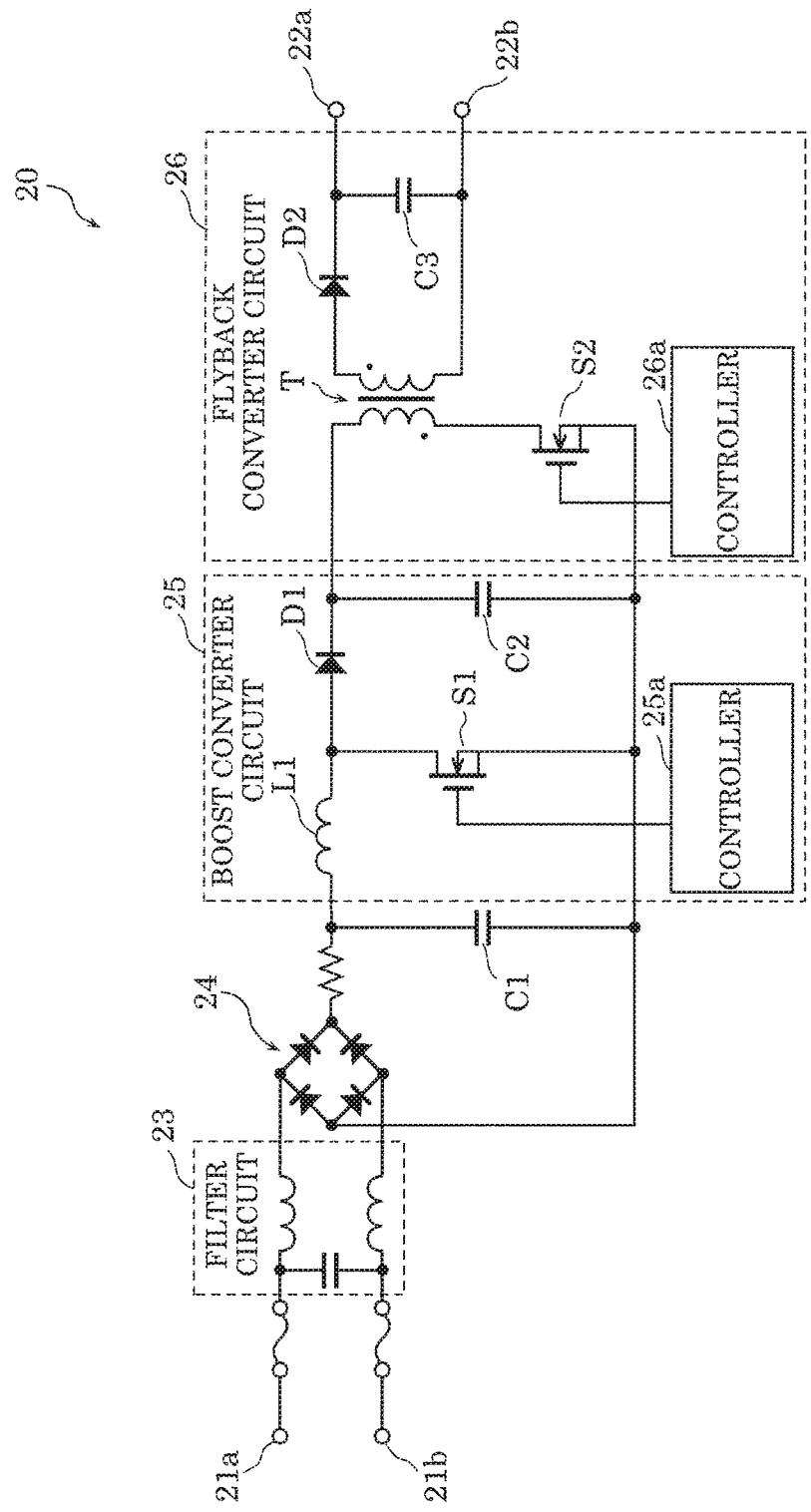
FIG. 2 is a diagram illustrating an example of a specific circuit configuration of a constant current supply circuit.

Next, a specific circuit configuration of constant current supply circuit 20 is described. FIG. 2 is a diagram illustrating an example of the specific circuit configuration of constant current supply circuit 20.

As illustrated in FIG. 2, constant current supply circuit 20 mainly includes filter circuit 23, rectifier circuit 24, capacitor C1, boost converter circuit 25, and flyback converter circuit 26.

Filter circuit 23 reduces noise that is included in the alternating current power obtained from electric power system 90, and noise that is generated in the converters and flows into electric power system 90. Filter circuit 23 includes an inductor and a capacitor, for example.

Rectifier circuit 24 converts, into direct current power, the alternating current power whose noise is reduced by filter circuit 23. Specifically, rectifier circuit 24 is a full wave rectifier circuit including a diode bridge.

Boost converter circuit 25 performs a power factor correction operation. Boost converter circuit 25 includes choke coil L1, switching element S1, diode D1, smoothing capacitor C2, and controller 25a.

Controller 25a is a control circuit (for example, a control IC) which causes switching element S1 to switch at a high rate. A high rate is from several tens of kHz to several hundreds of kHz, for example. Switching element S1 is a field effect transistor (FET), for example.

When switching element S1 is turned on by controller 25a, energy is stored in choke coil L1. When switching element S1 is turned off, choke coil L1 releases energy to maintain the current when switching element S1 is turned on. Consequently, a direct current voltage is outputted via diode D1. The outputted direct current voltage is smoothed by smoothing capacitor C2. Smoothing capacitor C2 is an electrolytic capacitor, for example.

Flyback converter circuit 26 converts the approximately constant direct current voltage outputted from boost converter circuit 25 into an approximately constant current.

Flyback converter circuit 26 includes transformer T, switching element S2, diode D2, smoothing capacitor C3, and controller 26a.

Controller 26a is a control circuit (for example, a control IC) which causes switching element S2 to switch (turning on and off repeatedly) at a high rate. Switching element S2 is an FET, for example. When switching element S2 is switched by controller 26a, energy is transmitted to the secondary winding from the primary winding of transformer T by electromagnetic induction, and the current flows into the secondary winding. This current is rectified by diode D2 and is smoothed by smoothing capacitor C3. In other words, smoothing capacitor C3 reduces a ripple current. Smoothing capacitor C3 is, for example, an electrolytic capacitor and is connected between output terminal 22a and output terminal 22b.

Note that controller 26a monitors the current flowing through the primary winding or the current flowing through the secondary winding, and changes the switching frequency or the duty ratio so that the monitored current becomes approximately constant. When the current flowing through the secondary winding is monitored, an insulating element such as a photocoupler is used.

Here, the operating frequency of flyback converter circuit 26 may be higher than the frequency (for example, approximately from several kHz to several MHz) corresponding to a bit rate of a visible-light-communication signal. Accordingly, since the impedance of smoothing capacitor C3 to the ripple current decreases, the ripple current is easily reduced by smoothing capacitor C3.

Note that first capacitor 50 and second capacitor 60 function similarly to smoothing capacitor C3 in lighting device 10. Therefore, constant current supply circuit 20 does not need to have smoothing capacitor C3 between output terminals. Omission of smoothing capacitor C3 enables reduction in number of components in lighting device 10.

Hereinbefore, the circuit configuration of constant current supply circuit 20 has been described, but such a circuit configuration is merely an example. Current supply circuit 20 may have other circuit configurations, as long as constant current supply circuit 20 is a power supply circuit which functions as a constant current source.

[Specific Configuration of First Modulation Circuit]

Figure 3:
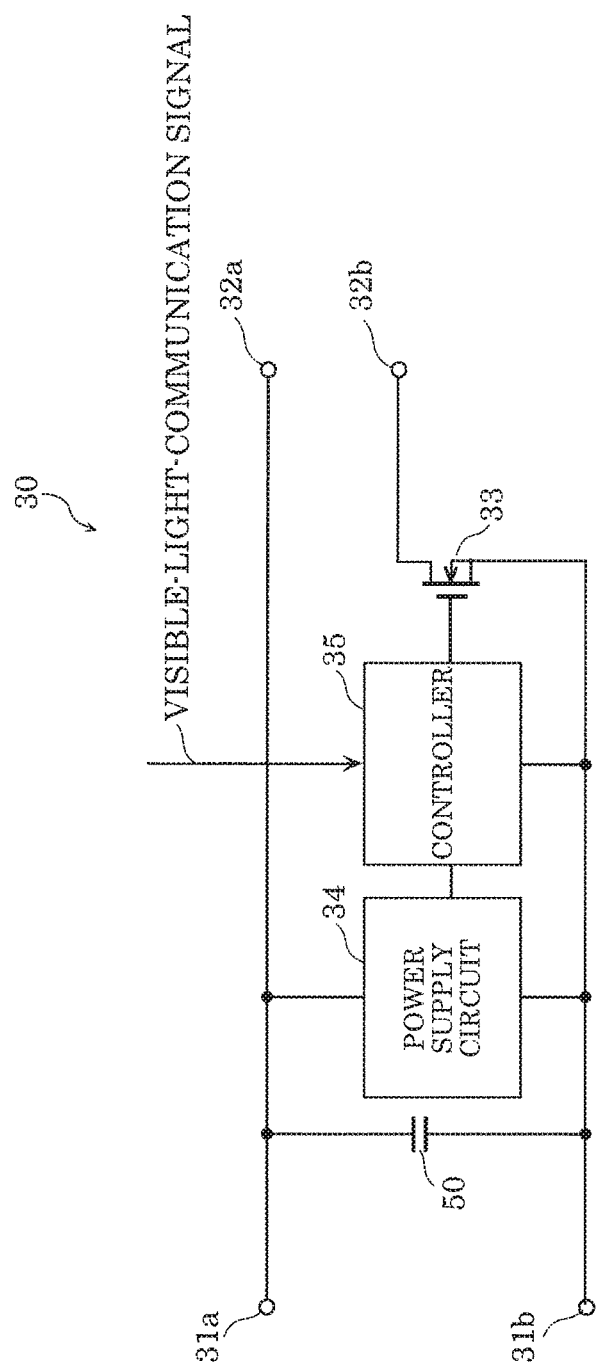
FIG. 3 is a diagram illustrating an example of a specific circuit configuration of a first modulation circuit.

Next, a specific circuit configuration of first modulation circuit 30 is described. FIG. 3 is a diagram illustrating an example of the specific circuit configuration of first modulation circuit 30.

As described above, first modulation circuit 30 modulates, and supplies first LED elements 70 with the current obtained from constant current supply circuit 20 or first capacitor 50 according to the first visible-light-communication signal. First modulation circuit 30 mainly includes first switching element 33, power supply circuit 34, and controller 35. Moreover, as described above, first capacitor 50 is inserted between input terminal 31a and input terminal 31b of first modulation circuit 30.

First switching element 33 is connected in series to first LED elements 70, and is switched by controller 35 according to the first visible-light-communication signal. First switching element 33 is an FET, for example.

Power supply circuit 34 generates supply voltage for operating controller 35 from the output voltage of constant current supply circuit 20. Power supply circuit 34 is a small switching regulator or a series regulator etc. which outputs a constant voltage, for example.

Controller 35 obtains the first visible-light-communication signal from the inside or the outside of controller 35, and switches first switching element according to the obtained first visible-light-communication signal. Consequently, first LED elements 70 turn on and off according to the first visible-light-communication signal.

Specifically, controller 35 is a microcomputer which operates with the supply voltage generated by power supply circuit 34. Controller 35 is, for example, a large scale integration (LSI) which includes: a read only memory (ROM) which holds a program; a random access memory (RAM) as a temporary storage region; a processor which executes a program; input/output circuits such as an Analog-to-Digital (A/D) converter and a Digital-to-Analog (D/A) converter; a counter timer, etc. Controller 35 turns on and off first switching element 33 according to a built-in program, for example.

Hereinbefore, the circuit configuration of first modulation circuit 30 has been described, but such a circuit configuration is merely an example. First modulation circuit 30 may have other circuit configurations. Note that a circuit configuration similar to the circuit configuration of first modulation circuit 30 is applicable to second modulation circuit 40. Therefore, the description of a specific circuit configuration of second modulation circuit 40 is omitted.

[Casing]

Figure 4:
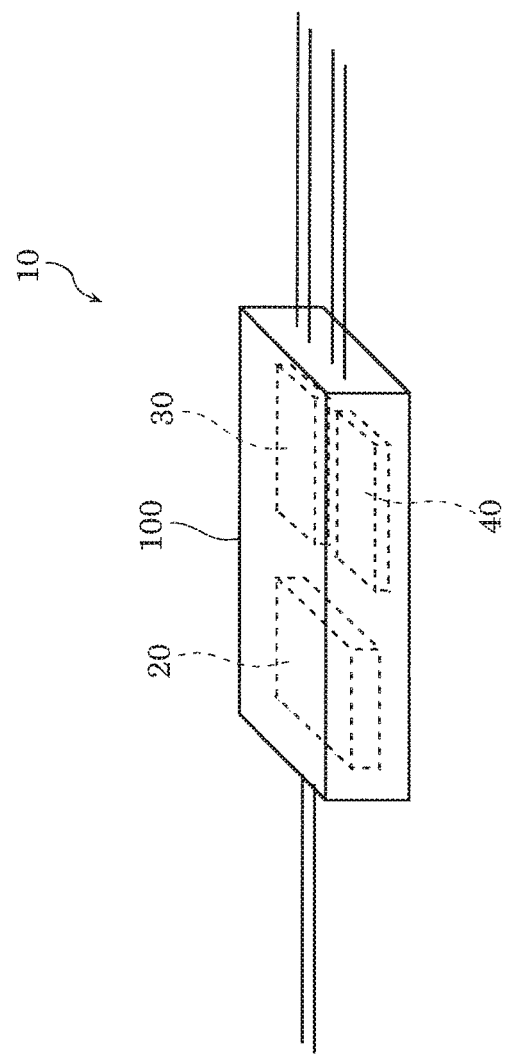
FIG. 4 is an external view of the lighting device in the case where the constant current supply circuit, the first modulation circuit, and the second modulation circuit are housed in a single casing.

Lighting device 10 may include a casing. For example, as illustrated in FIG. 4, lighting device 10 includes casing 100 that houses constant current supply circuit 20, first modulation circuit 30, and second modulation circuit 40. FIG. 4 is an external view of lighting device 10 in the case where constant current supply circuit 20, first modulation circuit 30, and second modulation circuit 40 are housed in a single casing 100.

Casing 100 is made of, for example, a metallic material such as aluminum. Casing 100 may also be made of a resin material such as polybutylene terephthalate resin.

Accordingly, if constant current supply circuit 20, first modulation circuit 30, and second modulation circuit 40 are housed in a single casing 100, the number of components can be reduced compared to when lighting device 10 includes a plurality of casings. In other words, the cost of lighting device 10 can be reduced. Furthermore, as described above, omission of smoothing capacitor C3 also enables reduction in cost of lighting device 10.

In casing 100, constant current supply circuit 20, first modulation circuit 30, and second modulation circuit 40 may be mounted on the same substrate, and each may be mounted on a different substrate. When constant current supply circuit 20, first modulation circuit 30, and second modulation circuit 40 are mounted on different substrates, the number of modulation circuits can be increased or decreased by changing the number of the substrates on which the modulation circuits are mounted. Therefore, the flexibility in number of the modulation circuits in designing and manufacturing can be increased.

Figure 5:
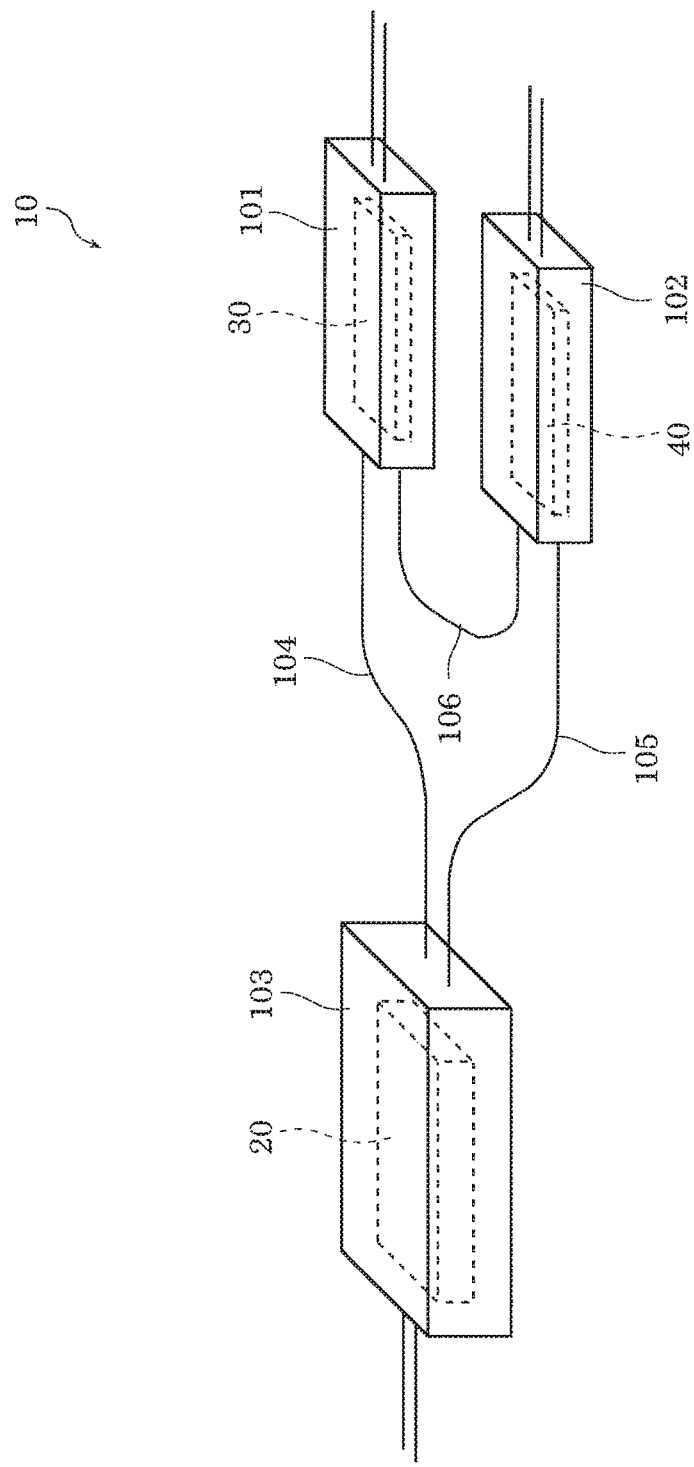
FIG. 5 is an external view of the lighting device in the case where the constant current supply circuit, the first modulation circuit, and the second modulation circuit are housed in different casings.

Moreover, constant current supply circuit 20, first modulation circuit 30, and second modulation circuit 40 may be housed in different casings. FIG. 5 is an external view of lighting device 10 in the case where constant current supply circuit 20, first modulation circuit 30, and second modulation circuit 40 are housed in different casings.

In the example of FIG. 5, lighting device 10 includes first casing 101 that houses first modulation circuit 30, second casing 102 that houses second modulation circuit 40, and third casing 103 that houses constant current supply circuit 20. First casing 101, second casing 102, and third casing 103 are made of, for example, a metallic material such as aluminum. First casing 101, second casing 102, and third casing 103 may also be made of a resin material such as polybutylene terephthalate resin.

In this case, constant current supply circuit 20 and first modulation circuit 30 are electrically connected by cable 104 disposed outside each casing. Constant current supply circuit 20 and second modulation circuit 40 are electrically connected by cable 105 disposed outside each casing. First modulation circuit 30 and second modulation circuit 40 are electrically connected by cable 106 disposed outside each casing.

Accordingly, when constant current supply circuit 20, first modulation circuit 30, and second modulation circuit 40 are housed in different casings, the modulation circuits can be easily attached to or removed from constant current supply circuit 20. Therefore, the number of modulation circuits connected to constant current supply circuit 20 may be easily increased or decreased. For example, it is easy to disconnect one of first modulation circuit 30 and second modulation circuit 40 to connect a single modulation circuit to constant current supply circuit 20. It is also easy to further add modulation circuits so that three or more modulation circuits are connected to constant current supply circuit 20. In other words, the flexibility in number of the modulation circuits in lighting device 10 is increased.

Note that in the configuration of FIG. 5, the radiation noise from cable 104 and cable 105 can be reduced in constant current supply circuit 20 by smoothing capacitor C3 connected between output terminal 22a and output terminal 22b.

[Effects, Etc.]

As described above, lighting device 10 includes: constant current supply circuit 20; and first modulation circuit 30 and second modulation circuit 40 that are connected in series between output terminal 22a and output terminal 22b of constant current supply circuit 20. First modulation circuit 30 includes first capacitor 50 that is connected in parallel to an input of first modulation circuit 30. Second modulation circuit 40 includes second capacitor 60 that is connected in parallel to an input of second modulation circuit 40. First modulation circuit 30 modulates, and supplies first LED elements 70 with the current obtained from constant current supply circuit 20 or first capacitor 50 according to a first visible-light-communication signal. Second modulation circuit 40 modulates, and supplies second LED elements 80 with the current obtained from constant current supply circuit 20 or second capacitor 60 according to the second visible-light-communication signal. Each of first LED elements 70 is an example of the first light-emitting element, and each of second LED elements 80 is an example of the second light-emitting element.

This enables lighting device 10 to output a plurality of different data signals at the same time using a single constant current supply circuit 20.

Furthermore, first modulation circuit 30 may include first switching element 33 that is connected in series to first LED elements 70 and that is switched according to the first visible-light-communication signal. Second modulation circuit 40 may include second switching element 43 that is connected in series to second LED elements 80 and that is switched according to the second visible-light-communication signal.

Accordingly, first modulation circuit 30 can modulate a current according to the first visible-light-communication signal by switching first switching element 33. Second modulation circuit 40 can modulate a current according to the second visible-light-communication signal by switching second switching element 43.

Moreover, constant current supply circuit 20 may have flyback converter circuit 26 that outputs a constant current, and does not need to have smoothing capacitor C3 between output terminal 22a and output terminal 22b. Flyback converter circuit 26 is an example of a converter circuit.

Accordingly, omission of smoothing capacitor C3 enables reduction in cost of lighting device 10. Note that in lighting device 10, first capacitor 50 and second capacitor 60 function similarly to smoothing capacitor C3.

Moreover, lighting device 10 may further include casing 100 that houses constant current supply circuit 20, first modulation circuit 30, and second modulation circuit 40.

Accordingly, the number of components can be reduced compared to when lighting device 10 includes a plurality of casings corresponding to constant current supply circuit 20, first modulation circuit 30, and second modulation circuit 40. In other words, the cost of lighting device 10 can be reduced.

Moreover, lighting device 10 further includes first casing 101 that houses first modulation circuit 30, second casing 102 that houses second modulation circuit 40, and third casing 103 that houses constant current supply circuit 20.

With this, the modulation circuits can be easily attached to and removed from constant current supply circuit 20, the number of the modulation circuits connected to constant current supply circuit 20 can be easily changed.

Embodiment 2

Figure 6:
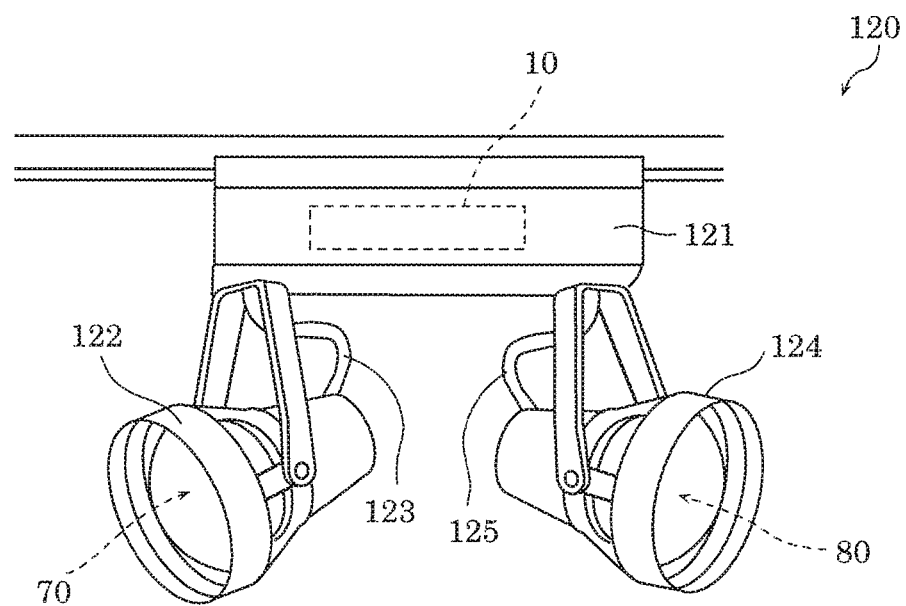
FIG. 6 is an external view of a luminaire according to Embodiment 2.

Embodiment 2 describes a luminaire including lighting device 10. FIG. 6 is an external view of the luminaire including lighting device 10.

Luminaire 120 illustrated in FIG. 6 is a spotlight placed on a structure such as a ceiling, a wall, or a pillar of a room. Luminaire 120 includes circuit box 121, first lamp body 122, cable 123, second lamp body 124, and cable 125.

Circuit box 121 houses lighting device 10. Circuit box 121 corresponds to, for example, the above-mentioned casing 100.

First lamp body 122 houses first LED elements 70. Cable 123 electrically connects lighting device 10 housed in circuit box 121 to first LED elements 70 housed in first lamp body 122. Second lamp body 124 houses second LED elements 80. Cable 125 electrically connects lighting device 10 housed in circuit box 121 to second LED elements 80 housed in second lamp body 124.

As described above, luminaire 120 includes lighting device 10, first LED elements 70, and second LED elements 80.

This enables luminaire 120 to output a plurality of types of data signals in parallel using a single constant current supply circuit 20. A user can read the first data signal by, for example, capturing the region illuminated by first lamp body 122 with a mobile terminal such as a smartphone having an image-capturing device. Moreover, a user can read the second data signal by, for example, capturing the region illuminated by second lamp body 124 with a mobile terminal.

Note that in luminaire 120, although the whole lighting device 10 is housed in circuit box 121, constant current supply circuit 20 may be housed in circuit box 121, first modulation circuit 30 may be housed in first lamp body 122, and second modulation circuit 40 may be housed in second lamp body 124.

Note that in the example of FIG. 6, luminaire 120 is implemented as a spotlight, but luminaire 120 may also be implemented as a luminaire other than a spotlight. For example, luminaire 120 may be a chandelier, a ceiling light, a stand light, a Japanese style light, a bracket light, a footlight, a pendant light, a base light, a downlight, a kitchen light, a bathroom light, or an exterior light.

Embodiment 3

Figure 7:
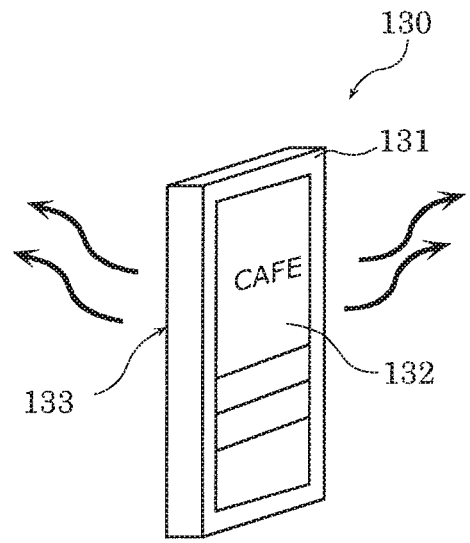
FIG. 7 is an external view of a signboard according to Embodiment 2.

Embodiment 3 describes a signboard including lighting device 10. FIG. 7 is an external view of the signboard including lighting device 10.

Signboard 130 illustrated in FIG. 7 includes frame 131, first display board 132, and second display board 133. Although not illustrated, signboard 130 includes lighting device 10, first LED elements 70, and second LED elements 80, inside the casing including frame 131, first display board 132, and second display board 133. Note that lighting device 10 may be disposed outside the casing.

First display board 132 covers a region surrounded by frame 131 from the front side. First display board 132 is light transmissive and includes at least one of a character and a graphic. Second display board 133 covers the region surrounded by frame 131 from the back side. Second display board 133 is light transmissive and includes at least one of a character and a graphic.

Inside signboard 130, first LED elements 70 are disposed to emit light toward first display board 132, and second LED elements 80 are disposed to emit light toward second display board 133. Therefore, first display board 132 is illuminated by first LED elements 70, and second display board 133 is illuminated by second LED elements 80.

As described above, signboard 130 includes: lighting device 10; first LED elements 70; second LED elements 80; first display board 132 that is illuminated by first LED elements 70 and that includes at least one of a character and a graphic; and second display board 133 that is illuminated by second LED elements 80 and that includes at least one of a character and a graphic.

Such signboard 130 can output the first data signal to the front side of signboard 130, and can output the second data signal to the back side of signboard 130. In other words, signboard 130 can output mutually different data signals to the front side and the back side in parallel.

A user can read the first data signal by, for example, capturing first display board 132 (front side of signboard 130) with a mobile terminal. Moreover, a user can read the second data signal by, for example, capturing second display board 133 (back side of signboard 130) with a mobile terminal.

Figure 8:
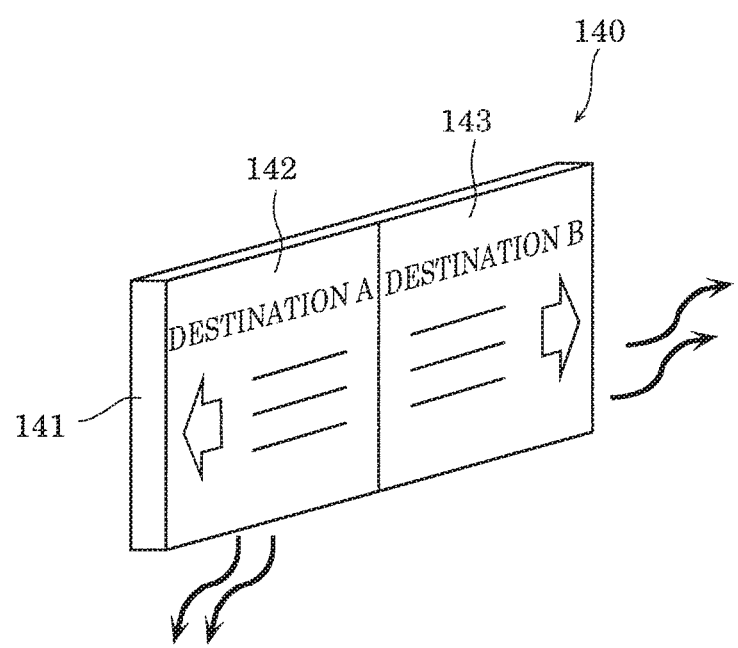
FIG. 8 is an external view of a signboard according to another aspect of Embodiment 2.

Note that both of first display board 132 and second display board 133 may be disposed on the front side of frame 131. FIG. 8 is an external view of another aspect of signboard that includes lighting device 10.

Signboard 140 illustrated in FIG. 8 includes frame 141, first display board 142, and second display board 143. Although not illustrated, signboard 140 includes lighting device 10, first LED elements 70, and second LED elements 80, inside the casing including frame 141, first display board 142, and second display board 143. Note that lighting device 10 may be disposed outside the casing.

Each of first display board 142 and second display board 143 covers a region surrounded by frame 141 from the front side. For example, first display board 142 is disposed on the left side and second display board 143 is disposed on the right side, as seen from a person facing signboard 140. Each of first display board 142 and second display board 143 is light transmissive and includes at least one of a character and a graphic. First display board 142 and second display board 143 may be a single display board that is formed integrally, or may be separate display boards.

Inside signboard 140, first LED elements 70 are disposed to emit light toward first display board 142, and second LED elements 80 are disposed to emit light toward second display board 143. Therefore, first display board 142 is illuminated by first LED elements 70, and second display board 143 is illuminated by second LED elements 80.

Such signboard 140 can output the first data signal and the second data signal on the front side of signboard 140 in parallel. In other words, signboard 140 can output different types of data signals on the front side of signboard 140 in parallel.

A user can read the first data signal by, for example, capturing first display board 142 (left side of signboard 140) with a mobile terminal. Moreover, a user can read the second data signal by, for example, capturing second display board 143 (right side of signboard 140) with a mobile terminal.

OTHER EMBODIMENTS

Hereinbefore, the embodiments have been described, but the present disclosure is not limited to such embodiments.

For example, the above-mentioned embodiments have described the first LED elements are turned on and off according to the first visible-light-communication signal, but turning off the first LED elements is not required. The first LED elements may repeat a bright state and a dark state. For example, the first LED elements may emit light of approximately 10% of the maximum brightness in the dark state. Similarly, the first LED elements do not need to emit light of the maximum brightness in the bright state, and may emit light of approximately 90% of the maximum brightness. The same applies to second LED elements.

Moreover, the circuit configurations described in the above embodiments are mere examples, and the present disclosure is not limited to the above circuit configurations. In other words, a circuit that implements the characteristic functions of the present disclosure is also included in the present disclosure, as with the above circuit configurations. For example, the present disclosure also includes a circuit configuration in which an element such as a switching element (transistor), a resistance element, and a capacitive element are connected in series or parallel to a certain element to the extent that the circuit configuration implements functions similar to the functions of the above circuit configurations.

Moreover, configurations obtained by various modifications to the aforementioned embodiments that can be conceived by a person skilled in the art as well as configurations realized by optionally combining structural components in different embodiments which are included in the one or more aspects of the present disclosure, as long as these do not depart from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting device, comprising:
a constant current supply circuit; and
a first modulation circuit and a second modulation circuit that are connected in series between output terminals of the constant current supply circuit,
wherein the first modulation circuit and the second modulation circuit each include two input terminals,
the first modulation circuit includes a first capacitor that is connected between the two input terminals of the first modulation circuit,
the second modulation circuit includes a second capacitor that is connected between the two input terminals of the second modulation circuit,
the first modulation circuit modulates, and supplies a first light-emitting element with, a current obtained from the constant current supply circuit and a current obtained from the first capacitor according to a first visible-light-communication signal, and
the second modulation circuit modulates, and supplies a second light-emitting element with, a current obtained from the constant current supply circuit and a current obtained from the second capacitor according to a second visible-light-communication signal.

2. The lighting device according to claim 1,
wherein the first modulation circuit includes a first switching element that is connected in series to the first light-emitting element and that is switched according to the first visible-light-communication signal, and
the second modulation circuit includes a second switching element that is connected in series to the second light-emitting element and that is switched according to the second visible-light-communication signal.

3. The lighting device according to claim 2,
wherein the first modulation circuit includes a first controller that switches the first switching element according to the first visible-light-communication signal, and
the second modulation circuit includes a second controller that switches the second switching element according to the second visible-light-communication signal.

4. The lighting device according to claim 3,
wherein the first modulation circuit includes a first power supply circuit that generates a supply voltage for operating the first controller, and
the second modulation circuit includes a second power supply circuit that generates a supply voltage for operating the second controller.

5. The lighting device according to claim 1,
wherein the constant current supply circuit includes a converter circuit that outputs a constant current, and no smoothing capacitor is disposed between the output terminals.

6. The lighting device according to claim 1, further comprising:
a casing that includes therein the constant current supply circuit, the first modulation circuit, and the second modulation circuit.

7. The lighting device according to claim 1, further comprising:
a first casing that includes therein the first modulation circuit;
a second casing that includes therein the second modulation circuit; and
a third casing that includes therein the constant current supply circuit.

8. A luminaire, comprising:
the lighting device according to claim 1;
the first light-emitting element; and
the second light-emitting element.

9. A signboard, comprising:
the lighting device according to claim 1;
the first light-emitting element;
the second light-emitting element;
a first display board that is illuminated by the first light-emitting element and that includes at least one of a character and a graphic; and
a second display board that is illuminated by the second light-emitting element and that includes at least one of a character and a graphic.

10. The lighting device according to claim 1,
wherein the first modulation circuit and the second modulation circuit each include two output terminals,
the first light-emitting element is connected between the two output terminals of the first modulation circuit, and
the second light-emitting element is connected between the two output terminals of the second modulation circuit.

11. The lighting device according to claim 1,
wherein the first modulation circuit includes a first switching element that is connected in series to the first light-emitting element to form a first series circuit which includes the first switching element and the first light-emitting element, the first switching element being switched according to the first visible-light-communication signal,
the first capacitor is connected in parallel with the first series circuit,
the second modulation circuit includes a second switching element that is connected in series to the second light-emitting element to form a second series circuit which includes the second switching element and the second light-emitting element, the second switching element being switched according to the second visible-light-communication signal, and
the second capacitor is connected in parallel with the second series circuit.

* * * * *